United States Patent
Liddell et al.

(10) Patent No.: US 8,327,383 B2
(45) Date of Patent: Dec. 4, 2012

(54) CANCELLATION OF CONCURRENT WORKER OBJECTS

(75) Inventors: Mike Liddell, Seattle, WA (US); John Duffy, Renton, WA (US)

(73) Assignee: Microsoft Corporation, Redmond, WA (US)

(*) Notice: Subject to any disclaimer, the term of this patent is extended or adjusted under 35 U.S.C. 154(b) by 438 days.

(21) Appl. No.: 12/727,689

(22) Filed: Mar. 19, 2010

(65) Prior Publication Data

US 2011/0231861 A1    Sep. 22, 2011

(51) Int. Cl.
*G06F 13/00* (2006.01)
(52) U.S. Cl. ........................ 719/315; 718/107
(58) Field of Classification Search .............. 719/315; 718/107
See application file for complete search history.

(56) References Cited

U.S. PATENT DOCUMENTS

| | | | |
|---|---|---|---|
| 6,449,657 B2 | 9/2002 | Stanbach, Jr. et al. | |
| 6,460,058 B2 * | 10/2002 | Koppolu et al. | 715/738 |
| 6,807,547 B2 * | 10/2004 | Matena et al. | 707/803 |
| 7,185,147 B2 | 2/2007 | Illikkal et al. | |
| 8,122,000 B2 * | 2/2012 | Vaughan et al. | 707/706 |
| 2004/0268370 A1 | 12/2004 | Mosier et al. | |
| 2005/0004786 A1 | 1/2005 | Thomason | |
| 2006/0126657 A1 * | 6/2006 | Beisiegel et al. | 370/465 |
| 2009/0313624 A1 | 12/2009 | Duffy et al. | |

FOREIGN PATENT DOCUMENTS

EP    1998253 A1    12/2008

OTHER PUBLICATIONS

Gidenstam, et al., "Allocating Memory in a Lock-Free Manner", Oct. 7, 2005, pp. 329-342.
Binkley, et al., "Automated Refactoring of Object Oriented Code into Aspects", Proceedings of the 21st IEEE International Conference on Software Maintenance, Sep. 25-30, 2005, pp. 10.
Smith, Vanessa, "Transaction Oriented Computational Models for Multi-Agent Systems", Jan. 14, 2004, pp. 44.

* cited by examiner

*Primary Examiner* — Andy Ho

(57) ABSTRACT

A method of performing a cancellation of concurrent worker objects includes creating a plurality of concurrent worker objects with a manager object. At least one cancellation object is generated with the manager object. The at least one cancellation object includes a cancel method and a register method that support concurrent calls. A callback function is registered by calling the register method with one of the concurrent worker objects. A cancellation of the concurrent worker objects is requested by calling the cancel method with the manager object.

20 Claims, 6 Drawing Sheets

CANCELLATION OF CONCURRENT WORKER OBJECTS

CROSS-REFERENCE TO RELATED APPLICATION

This application is related to U.S. patent application Ser. No. 12/139,515, filed Jun. 16, 2008, entitled "Unified and Extensible Asynchronous and Synchronous Cancellation", and published as U.S. Patent Application No. 2009/0313624 A1; and the entire teachings of which are incorporated herein by reference.

BACKGROUND

Software programs have been written to run sequentially since the beginning days of software development. Steadily over time, computers have become much more powerful, with more processing power and memory to handle advanced operations. This trend has recently shifted away from ever-increasing single-processor clock rates towards an increase in the number of processors available in a single computer resulting in a corresponding shift away from sequential execution toward parallel execution. Software developers want to take advantage of improvements in computer processing power to enable their software programs to run faster as new hardware is adopted. With parallel hardware, software developers arrange for one or more tasks of a particular software program to be executed in parallel (also referred to as concurrently), so that, for example, the same logical operation can utilize many processors at one time to thereby deliver better performance as more processors are added to the computers on which such software runs.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A problem addressed herein is how to implement a unified cancellation system such that it is efficient for use by many concurrent processes on multi-processor machines. One embodiment provides a unified cancellation system that provides multiple types of efficiency, and provides concurrent access to one or more cancellation management types.

One embodiment provides a method of performing a cancellation of concurrent worker objects. The method includes creating a plurality of concurrent worker objects with a manager object. At least one cancellation object is generated with the manager object. The cancellation object includes a cancel method and a register method that support concurrent calls. A callback function is registered by calling the register method with one of the concurrent worker objects. A cancellation of the concurrent worker objects is requested by calling the cancel method with the manager object.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

Figure 1:
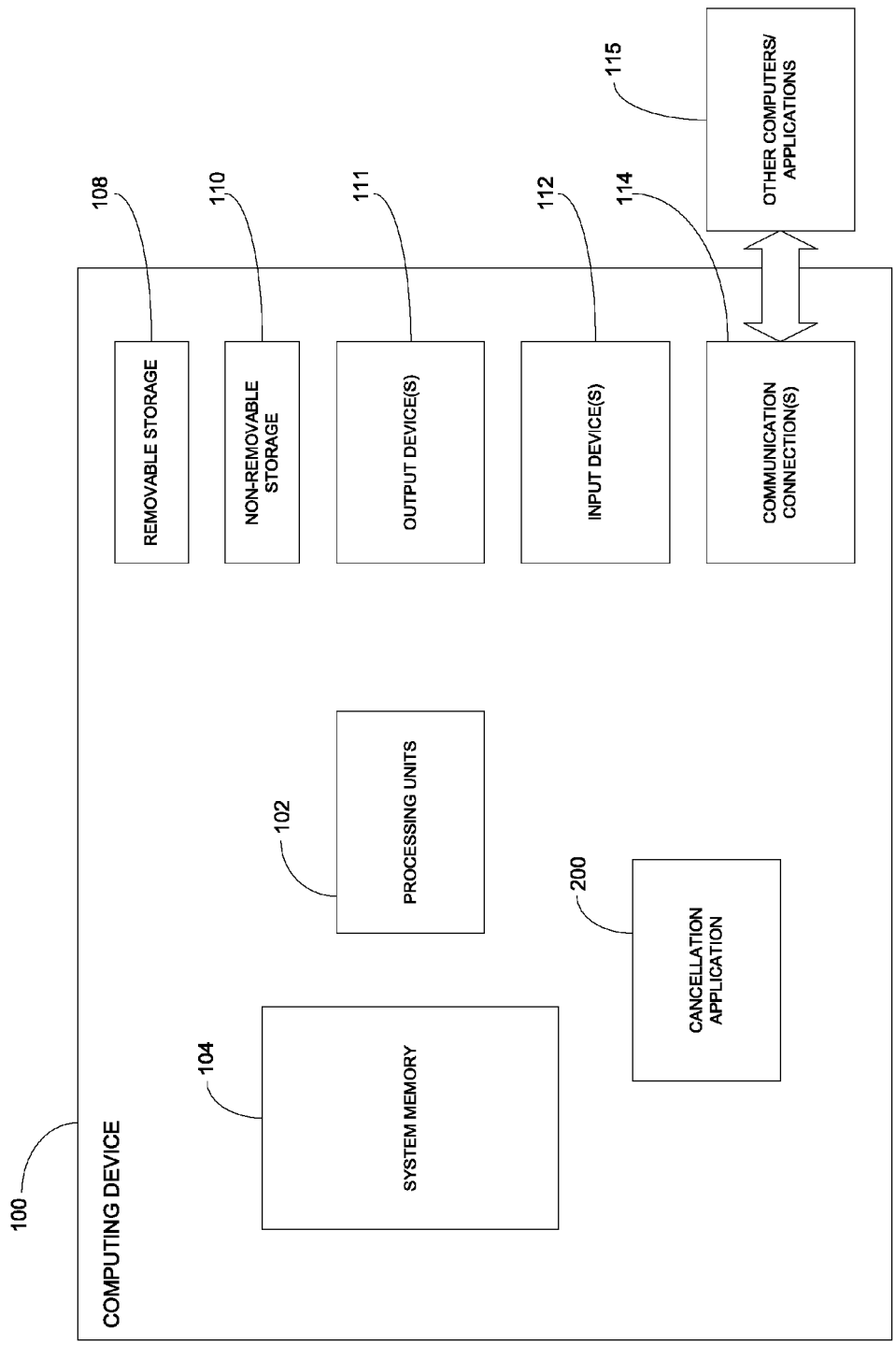
FIG. 1 is a diagram illustrating a computing device suitable for executing a cancellation application according to one embodiment.

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

One embodiment provides a cancellation application, but the technologies and techniques described herein also serve other purposes in addition to these. In one embodiment, the cancellation application provides an efficient unified cancellation system for multi-processor systems. A "unified cancellation system" according to one embodiment is a system with one or more cancellation management types that can be used by disparate application programming interfaces (APIs) to implement safe, timely, and composable cancellation, and that includes mechanisms that permit polling and registering and deregistering callbacks. In one implementation, one or more of the techniques described herein can be implemented as features within a framework program such as the Microsoft®.NET Framework, or within any other type of program or service that handles parallel operations in programs.

A problem addressed herein is how to implement a unified cancellation system such that it is efficient for use by many concurrent processes on multi-processor machines. In this context according to one embodiment, efficiency means that: (1) adding and removing cancellation callbacks is fast (registering and deregistering callbacks may occur many times even when a request to actually perform cancellation never occurs, and registering and deregistering may be provided in low level code for which overheads are carefully managed); (2) passing objects used for cancellation are cheap as they may be passed down call-stacks and across thread invocations; (3) the total memory usage for the cancellation objects and their callback-tracking data structures is kept to a minimum. One embodiment provides a cancellation system that addresses each type of efficiency listed above, and provides concurrent access to one or more cancellation management types.

The cancellation system according to one embodiment includes an efficient algorithm for registering callbacks, an efficient deregister mechanism for deregistering callbacks, and a cancellation method that orchestrates the execution of extant registered callback methods. One embodiment includes a callback tracking data structure that is lock-free and false-sharing resistant, and provides safe callback management for situations involving restrictive synchronization context targets. One embodiment separates a single logical CancellationType into two separate types to provide a cleaner and safer API for usage, particularly when disparate libraries interact and share cancellation objects. The cancellation system according to one embodiment also provides exception management for situations where one or more callback functions throw an exception. These features are described in further detail below.

FIG. 1 is a diagram illustrating a computing device 100 suitable for executing a cancellation application according to one embodiment. In the illustrated embodiment, the computing system or computing device 100 includes a plurality of processing units 102 and system memory 104. Depending on the exact configuration and type of computing device, memory 104 may be volatile (such as RAM), non-volatile (such as ROM, flash memory, etc.), or some combination of the two.

Computing device 100 may also have additional features/functionality. For example, computing device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media (e.g., computer-readable storage media storing computer-executable instructions that when executed by at least one processor cause the at least one processor to perform a method). Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

In one embodiment, computing device 100 includes a cancellation application 200. Cancellation application 200 is described in further detail below with reference to FIG. 2.

Figure 2:
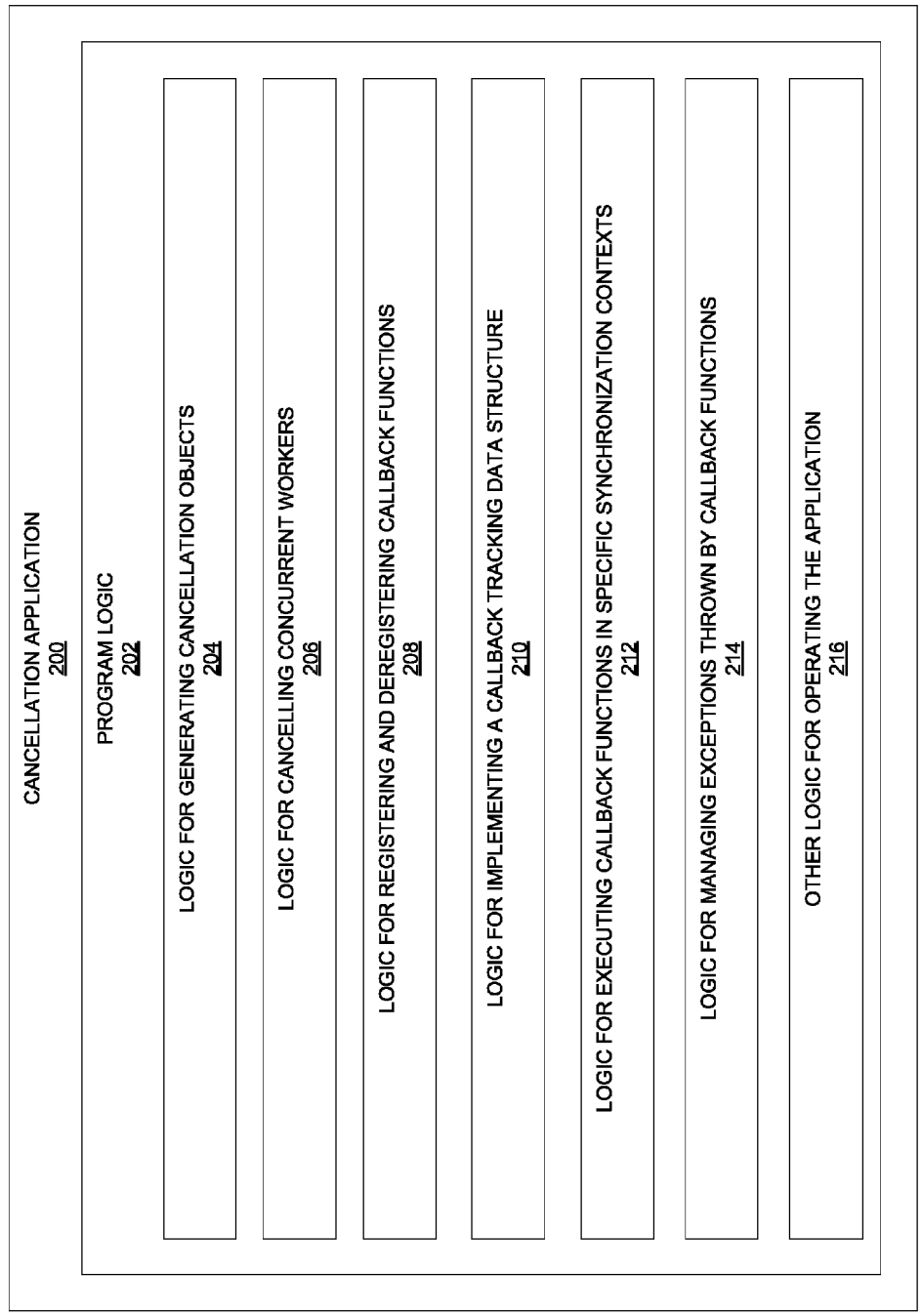
FIG. 2 is a diagrammatic view of a cancellation application for operation on the computing device illustrated in FIG. 1 according to one embodiment.

FIG. 2 is a diagrammatic view of a cancellation application 200 for operation on the computing device 100 illustrated in FIG. 1 according to one embodiment. Application 200 is one of the application programs that reside on computing device 100. However, application 200 can alternatively or additionally be embodied as computer-executable instructions on one or more computers and/or in different variations than illustrated in FIG. 1. Alternatively or additionally, one or more parts of application 200 can be part of system memory 104, on other computers and/or applications 115, or other such suitable variations as would occur to one in the computer software art.

Cancellation application 200 includes program logic 202, which is responsible for carrying out some or all of the techniques described herein. Program logic 202 includes logic 204 for generating cancellation objects; logic 206 for cancelling concurrent workers; logic 208 for registering and deregistering callback functions; logic 210 for implementing a callback tracking data structure; logic 212 for executing callback functions in specific synchronization contexts; logic 214 for managing exceptions thrown by callback functions; and other logic 216 for operating the application.

Turning now to FIGS. 3-6, techniques for implementing one or more embodiments of cancellation application 200 are described in further detail. In some implementations, the techniques illustrated in FIGS. 3-6 are at least partially implemented in the operating logic of computing device 100.

Figure 3:
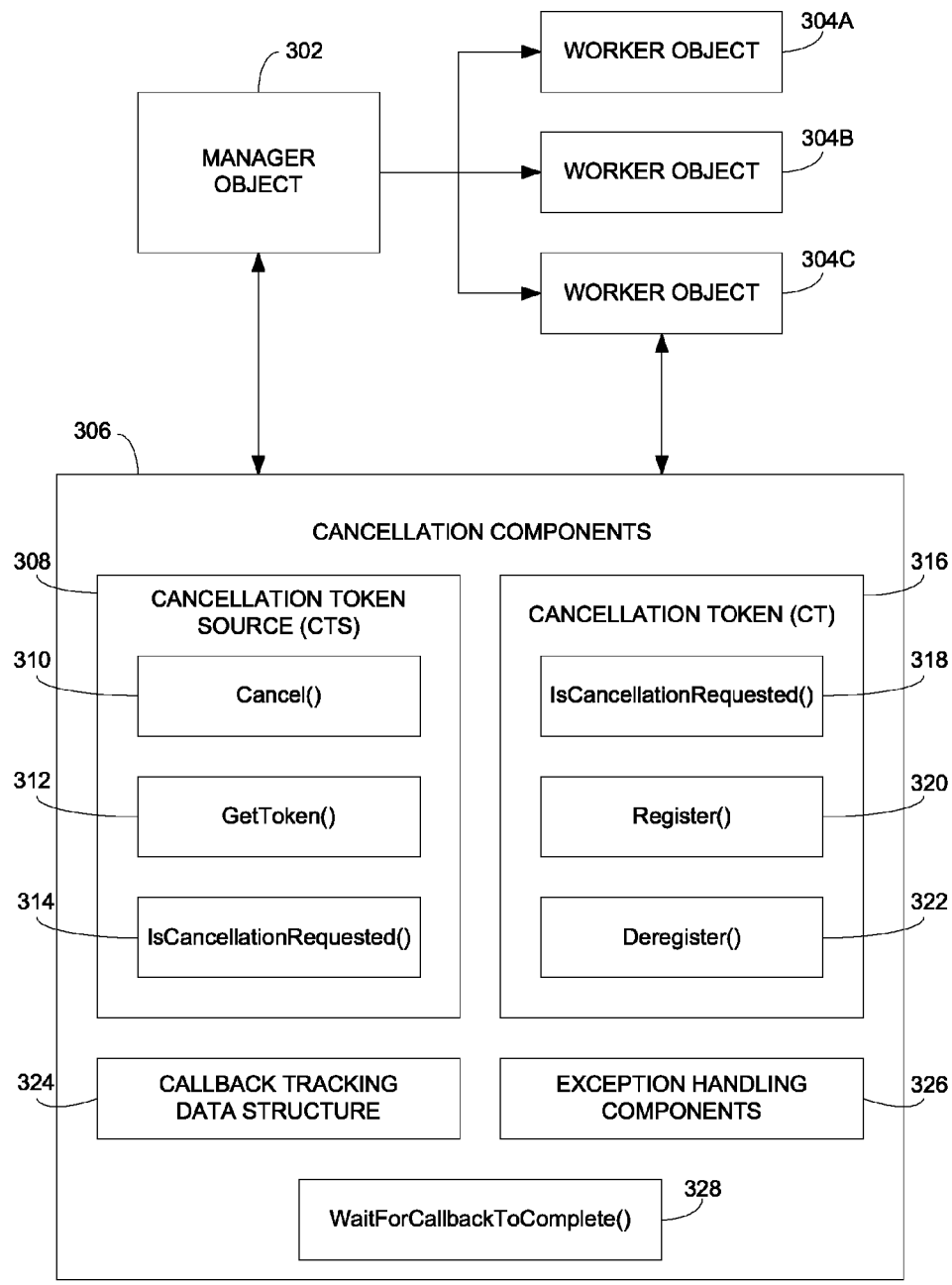
FIG. 3 is a block diagram illustrating cancellation components according to one embodiment.

FIG. 3 is a block diagram illustrating cancellation components according to one embodiment. In one usage scenario, a manager object 302 creates a plurality of concurrent worker objects 304A-304C (collectively referred to as worker objects 304). Manager object 302 and worker objects 304 use cancellation components 306 to implement cancellation functionality. As shown in FIG. 3, cancellation components 306 include cancellation token source (CTS) object 308, cancellation token (CT) object 316, callback tracking data structure 324, exception handling components 326, and WaitForCallbackToComplete( ) method 328.

In one embodiment, at the time that worker objects 304 are created, manager object 302 also creates a CTS object 308. In the illustrated embodiment, CTS object 308 includes Cancel( ) method 310, GetToken( ) method 312, and IsCancellationRequested( ) method 314. The manager object 302 then calls the GetToken( ) method 312 of the CTS object 308, which creates a CT object 316 that refers back to (e.g., includes a pointer that points to) the CTS object 308. In the illustrated embodiment, CT object 316 includes IsCancellationRequested( ) method 318, Register( ) method 320, and Deregister( ) method 322. The manager object 302 then passes the CT object 316 to each of the worker objects 304. The worker objects 304 may create additional sub-worker objects, copy/clone the CT object 316, and pass it on to these additional sub-worker objects.

CTS object 308 and CT object 316 are cancellation objects that are instantiated from one or more types. The following Pseudo Code Example I gives an example of a CancellationType according to one embodiment:

---

PSEUDO CODE EXAMPLE I

CancellationType :
    bool IsCancellationRequested( ): return true if the
    cancellationObject is in the canceled state, false otherwise.
    void Cancel( ): transition the cancellationObject to the
    "canceled" state.
    RegistrationInfo Register(callbackFunc): register a
    callback function that will be called if the
    cancellationObject is in, or transitions to, the "canceled"
    state.
    void Deregister(registrationInfo): deregister a previously
    registered callback function.

In the embodiment represented by Pseudo Code Example I, a single CancellationType is used to provide cancellation functionality. In another embodiment described below, this single CancellationType is divided into two cancellation types. An example usage pattern of the CancellationType given in Pseudo Code Example I will now be described. An initial step is to instantiate a CancellationObject based on the CancellationType. A work function is then commenced, such as calling a long-running function or initiating asynchronous work, and the CancellationObject is passed as a parameter to the work function. In the embodiment shown in FIG. 3, worker objects 304 are created, and CT object 316 is passed to the worker objects 304. The work function may register and deregister callback functions (e.g., using register( ) method 320 and deregister( ) method 322), poll on the IsCancellationRequested Boolean (e.g., by calling method 318), and pass the CancellationObject as a parameter to sub-operation functions. The sub-operation functions may continue to do this recursively. The same CancellationObject may be passed to concurrent operations that run on separate threads of execution. The concurrent operations may also register and deregister callback functions, and pass the CancellationObject to sub-operations.

If a call is made to CancellationObject.Cancel( ) (e.g., calling cancel method 310), the CancellationObject transitions to the "canceled" state, and all currently registered callbacks are executed in response to the cancellation. In one embodiment, any callbacks that are subsequently registered are also executed. The IsCancellationRequested boolean enables operations (e.g., worker objects 304) to detect that cancellation has been requested and respond to it by terminating their work and releasing their resources in an efficient manner.

Some callback functions may have to execute in a specific synchronization context due to the programming model of the objects involved in the cancelable operations. In one embodiment, the Register( ) method in Pseudo Code Example I accepts a UseCurrentSynchronizationContext parameter in addition to the callbackFunc parameter. If the UseCurrentSynchronizationContext parameter is used, and has the value "true", then the callback is run in the context as was visible to the thread of execution that performed the Register operation. If the callback is executed at a later time, and in a different synchronization context, then the original context is reestablished, which may involve thread transitions and lock acquisitions. These considerations are self-contained within each SynchronizationContext, but the most restrictive is called the SingleDedicatedSequentialThreadSyncContext. For this particular SynchronizationContext, all callbacks that target it run on a single dedicated thread, and the callbacks are serialized.

One embodiment provides a unified cancellation system that is intended to be used by disparate APIs that can loosely cooperate to observe and react to a single "cancellation request". There are two distinct consumers of a CancellationObject: (1) a single initiator or manager; and (2) one or more listeners. The initiator corresponds to the manager object 302, and the listeners correspond to the worker objects 304. The manager object 302 is the creator of the cancellation object, and provides it to concurrent operations (e.g., worker objects 304) on one or more threads of execution. The manager object 302 is also the single caller of the Cancel( ) method 310. The listeners (e.g., worker objects 304) receive the cancellation object, observe the IsCancellationRequested property, and add/remove callbacks. In one embodiment, these listeners do not call the Cancel( ) method 310 themselves, nor does a worker object 304 have access to the callbacks registered by other worker objects 304. In one embodiment, the cancellation type given in Pseudo Code Example I is divided into two distinct types to address the issue raised by having two distinct consumers of a cancellation object. In one embodiment, the cancellation type given in Pseudo Code Example I is divided into a CancellationTokenSource (CTS) type and a CancellationToken (CT) type, as shown in the following Pseudo Code Examples II and III:

PSEUDO CODE EXAMPLE II

CancellationTokenSource:
    Cancel( )
    CancellationToken GetToken( )
    IsCancellationRequested( )

PSEUDO CODE EXAMPLE III

CancellationToken:
    IsCancellationRequested( )
    RegistrationInfo Register(FunctionRef callback, bool useSyncContext)
    Deregister(RegistrationInfo reg)

In one embodiment, a CTS object 308 is instantiated from the type given in Pseudo Code Example II, and a CT object 316 is instantiated from the type given in Pseudo Code Example III. In one embodiment, operations that receive a CT object 316 cannot affect other cancellation token objects, nor initiate a cancellation request (e.g., call the Cancel( ) method 310) themselves. This separation promotes correct usage patterns and promotes isolation of disparate APIs. In one embodiment, the CTS object 308 is the only holder of state and the CT object(s) 316 are pointers to the CTS object 308, albeit with a different API to that available to a true pointer to the CTS object 308. In another embodiment, each CT object 316 maintains state.

One embodiment provides a lock-free algorithm that permits concurrent calls to the Register( ) method 320, Deregister( ) method 322, and Cancel( ) method 310. Each of these methods will now be described in further detail.

In one embodiment, the Register( ) method 320 takes the form "Register(FunctionRef callback, bool useSyncContext)." If IsCancellationRequested( ) 318 is "true" when the Register( ) method 320 is called, the callback function to be registered is executed synchronously in one embodiment (i.e., immediately and before the Register( ) method 320 returns control to the caller). If IsCancellationRequested( ) 318 is "false" when the Register( ) method 320 is called, the callback function to be registered is added to the callback tracking data structure 324. If IsCancellationRequested( ) 318 is still "false" after the callback function to be registered has been added to the callback tracking data structure 324, the Register( ) method 320 returns. If IsCancellationRequested( ) 318 is "true" after the callback function to be registered has been added to the callback tracking data structure 324, the callback function is deregistered from the callback tracking data structure 324. If the register method was unable to deregister the callback, it waits for the callback to complete (e.g., via the WaitForCallbackToComplete( ) method 328), and then returns a dummy RegistrationInfo (i.e., a null, or an "empty" RegistrationInfo). In the case that the callback is successfully deregistered from the tracking data structure, the callback is executed synchronously (i.e., immediately and before the Register( ) method 320 returns control to the caller).

In one embodiment, the Deregister( ) method 322 takes the form "Deregister(RegistrationInfo registration)." If the RegistrationInfo represents a dummy registration, the Deregister( ) method 322 returns immediately. If the RegistrationInfo does not represent a dummy registration, the Deregister( ) method 322 performs the following: (1) deregister the callback function from the callback tracking data structure 324; (2) If IsCancellationRequested( ) 318 is "true", AND the attempt to deregister failed (e.g., the callback function was no longer in the callback tracking data structure 324), AND the thread executing callbacks is not the same as the thread executing this Deregister( ) method 322, THEN the Deregister( ) method 322 waits for the callback to complete (e.g., via the WaitForCallbackToComplete( ) method 328); (3) otherwise, the Deregister( ) method 322 returns immediately.

In one embodiment, the Cancel( ) method 310 is implemented as follows. A compare and exchange (CMPXCH) operation is performed to attempt to change cancellationObject.state to "canceled". If the state was successfully changed to canceled (e.g., a first thread was the first winner out of concurrent callers to Cancel( )), ExecutingThreadID is set to the ID of the first thread such that the Deregister( ) method 322 can observe it, and ExecuteCallbackHandlers is performed by repeating the following seven steps until no callbacks remain: (1) Take a copy of a callback from the callback tracking data structure 324; (2) if a SyncContext was saved with the callback, transition to that SyncContext and continue there with the next step, otherwise continue immediately to the next step; (3) if a thread transition occurred, update the tracked threadID such that calls to the Deregister( ) method 322 can observe it; (4) remove the original callback from the callback tracking data structure 324; (5) if the callback existed and was removed successfully, then set ExecutingCallback=callback, such that the WaitForCallbackToComplete( ) method 328 can observe it, and call the callback; (6) if a SyncContext was used for the previous steps, return to the original thread and continue remaining step; (7) if a thread transition occurred, reinstate the ExecutingThreadID to its previous value (i.e., to the ID of the "first thread" mentioned above). After all of the callbacks have been executed, ExecutingCallback is set to null.

There are situations where the cancellation system described herein waits for callback functions to complete. In one embodiment, a WaitForCallbackToComplete( ) method 328 is provided that takes the form "WaitForCallbackToComplete(CallbackReference callback)". This method 328 according to one embodiment makes sure that when it exits, the callback is not currently executing. If the callback was not executing, the method 328 returns immediately. While the callback is executing (e.g., "While ExecutingCallback== callback"), the method 328 performs a micro-wait such as a regular "spin wait".

The calls to the WaitForCallbackToComplete( ) method 328 are used in one embodiment so that the following pattern is safe: (1) CallbackRegistration cr=Register(callback); (2) do work; (3) Deregister(cr); and (4) dispose and destroy resources that the callback referenced. The WaitForCallbackToComplete( ) method 328 according to one embodiment makes sure that when the Deregister( ) method 322 returns, the callback will not subsequently commence, and that it is not currently executing. One caveat is made with respect to step "(2)" of the Deregister method 322 described above (i.e., IF IsCancellationRequested( ) 318 is "true", AND the attempt to deregister failed (e.g., the callback function was no longer in the callback tracking data structure 324), AND the thread executing callbacks is not the same as the thread executing this Deregister( ) method 322, THEN the Deregister( ) method 322 waits for the callback to complete (e.g., via the WaitForCallbackToComplete( ) method 328). In one embodiment, if the callback is currently running on the same thread that calls the Deregister( ) method 322, then no wait occurs.

As described above with respect to the Register( ) method 320, if IsCancellationRequested( ) 318 is "true" after the callback function to be registered has been added to the callback tracking data structure 324, the callback function is deregistered from the callback tracking data structure 324. This step essentially answers the question "has the callback been executed," and makes sure that, if the callback has not yet executed, a concurrent call to Cancel( ) 310 will not subsequently execute it. There are various approaches to address this situation, such as using flags that are updated via CMPXCH operations, but the existence/nonexistence of the callback in the callback tracking data structure 324 is an approach that is used in one embodiment and does not involve the use of additional flags.

As described above with respect to the Deregister( ) method 322, IF IsCancellationRequested( ) 318 is "true", AND the attempt to deregister failed (e.g., the callback function was no longer in the callback tracking data structure 324), AND the thread executing callbacks is not the same as the thread executing this Deregister( ) method 322, THEN the Deregister( ) method 322 waits for the callback to complete). Thus, this step of the Deregister( ) method 322 according to one embodiment waits for the callback to finish execution if the callback may be running, and is not running on the same thread that has called the Deregister( ) method 322. This means that if a callback attempts to deregister itself, the system will not deadlock. The situation of a callback deregistering itself is most likely bad practice, but the deadlock should be avoided nonetheless.

As described above with respect to the Cancel( ) method 310, step "(1)" involves taking a copy of a callback from the callback tracking data structure 324, and step "(4)" involves removing the original callback from the callback tracking data structure 324. In one embodiment, these steps make sure that the actual act of removing the callback occurs in the context that it will be executed. If this is not done, a concurrent usage of the same SingleDedicatedSequentialThreadSyncContext that calls the Deregister( ) method 322 referring to this same callback may cause a deadlock in step "(2)" of the Deregister( ) method 322 if a wait occurs.

Figure 4:
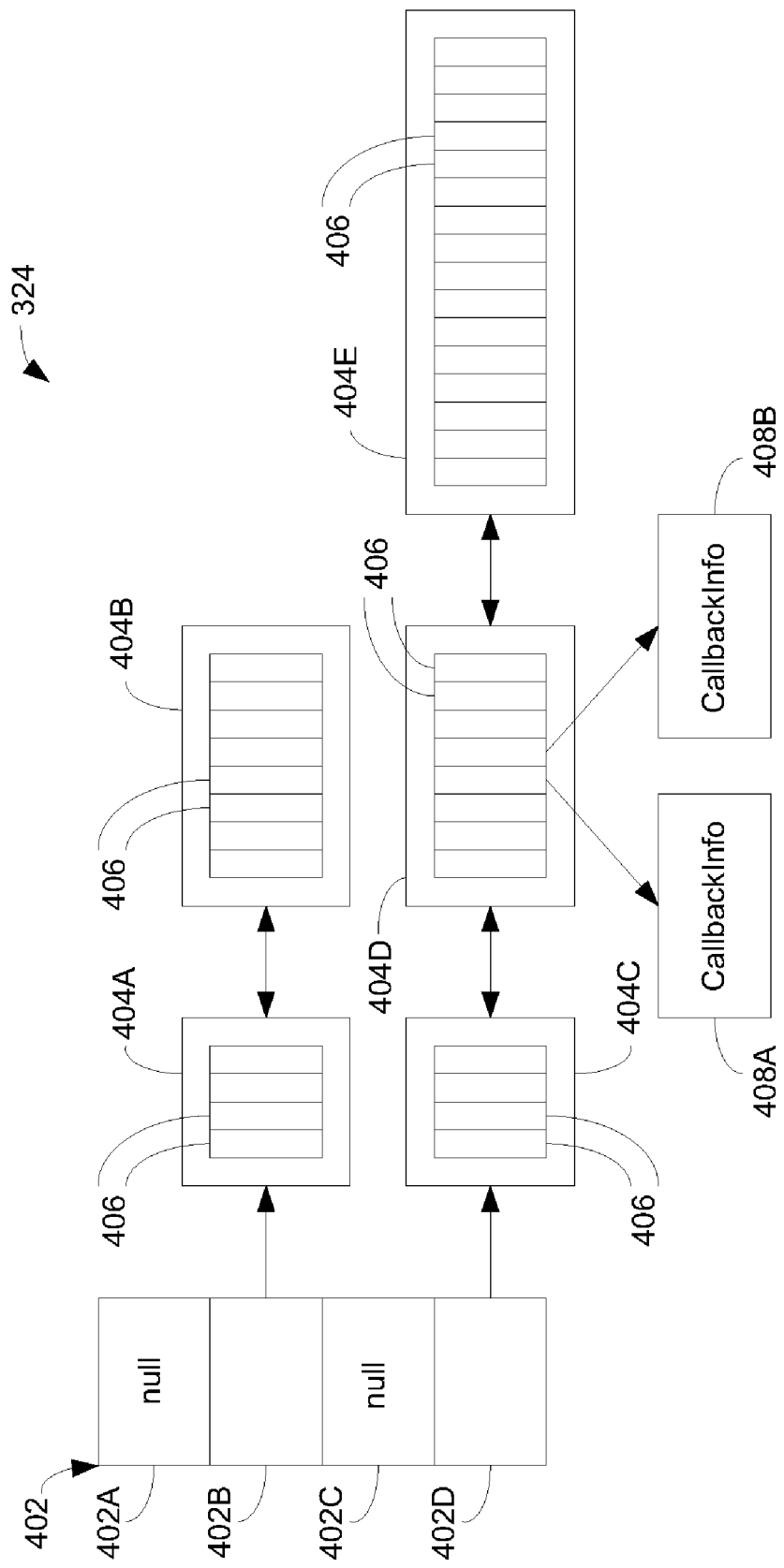
FIG. 4 is a diagram illustrating a callback tracking data structure according to one embodiment.

The callback tracking data structure 324 according to one embodiment will now be described in further detail. The callback tracking data structure 324 according to one embodiment provides fast execution for many concurrent executions of the Register( ) method 320 and the Deregister( ) method 322. FIG. 4 is a diagram illustrating a callback tracking data structure 324 according to one embodiment. Data structure 324 includes a set of sparse arrays 402A-402D (collectively referred to as sparse arrays 402). Sparse arrays 402A and 402C are empty as indicated by the text "null". Sparse array 402B includes a plurality of sparse array segments 404A and 404B. Sparse array 402D includes a plurality of sparse array segments 404C, 404D, and 404E. Sparse array segments 404A-404E are collectively referred to herein as sparse array segments 404. Each sparse array segment 404 includes a plurality of slots 406. Each slot 406 is used to store a reference to a CallbackInfo for a particular callback function. For example, two slots 406 of segment 404D are used to store CallbackInfo 408A and 408B (collectively referred to as CallbackInfo 408).

In one embodiment, the callback tracking data structure 324 is used in a cancellation method as follows: (1) multiple sparse arrays 402 are used to hold callback information; (2) a thread calling the Register( ) method 320 selects one of the sparse arrays 402 via arithmetic on its ThreadID, or otherwise arranges to partition the available sparse arrays 402 amongst calling threads; (3) the sparse arrays 402 are allocated to avoid false-sharing (e.g., in one embodiment, the first thread that is assigned a particular sparse array 402 performs the allocation, on the assumption that threads allocate data structures from different heaps or at least different heap segments, with the intention being that the sparse arrays 402 will not be allocated in adjacent memory locations, and hence will avoid false-sharing access patterns); (4) each sparse array 402 according to one embodiment is a doubly linked list of array segments 404, and each slot 406 in an array segment 404 holds a single pointer to a CallbackInfo structure 408 (each segment 404 may either be the same size, or increasing in size as shown in FIG. 4 to amortize the overheads per segment 404, so each element of a sparse array 402 can be manipulated via CMPXCH operations to permit thread-safe additions and removals; (5) when a CallbackInfo 408 is added to the data structure 324, a RegistrationInfo object is returned that indicates the sparse array 402 and the slot number 406 where the item was added (hence locating a callback for removal is an "O(1)" operation, where "O(1)" is a Big 0 notation that indicates that the operation executes in the same time regardless of the input data); and (6) when adding an item to a sparse array 402, an empty slot 406 is located.

An approach for adding an item to a sparse array 402 according to one embodiment involves the following: (6A) start with the tail of the sparse array 402 segment list; (6B) track the number of empty slots 406 in each array segment 404 either precisely or approximately; (6C) if the number of empty slots 406 exceeds a given threshold, then perform a linear scan to locate an empty slot 406; and (6D) otherwise, if there is a previous segment 404, set it as the current segment 404 and continue from step 6A; if there is not a previous segment 404, create a new segment 404, attach it to the tail segment 404, set it as the current segment 404, and continue from step 6A.

The callback tracking data structure 324 according to one embodiment has the following characteristics: (1) Additions are fast, and tunable via the threshold parameter (e.g., the threshold can permit tight memory usage at the cost of time used to scan for free locations, or provide amortized-fast additions at the cost of higher memory costs); (2) locating previously added items is O(1); (3) false-sharing and general cache-contention is significantly reduced over other schemes; and (4) no coarse-grained locks are used.

In other embodiments, a different structure may be used for callback tracking data structure 324, and variants on the above approach may be used. For example, linked-lists, sets of linked-lists, and various tree-structures may be used in other embodiments. Sets of simple arrays with associated empty-cell tracking information, or fully-featured garbage-collector schemes may also be used.

Exception handling components 326 (FIG. 3) will now be described in further detail. When the Cancel( ) method 310 is called, a set of callbacks may be executed. Depending on the usage of the CancellationObject, two principal usage patterns exist: (1) logically execute all of the callbacks and accumulate all of the exceptions that may arise; and (2) logically execute the callbacks one by one, and if and when a callback throws an exception, immediately throw that exception and discontinue execution of remaining callbacks. One embodiment provides one of these two usage patterns. Another embodiment provides both of these usage patterns. Yet other embodiments provide a variant of these usage patterns.

In one embodiment, the signature of the Cancel( ) method 310 is changed to "Cancel(bool throwOnFirstException)", and the Cancel( ) method 310 is modified as follows. Subsequent to step "(5)" of the Cancel( ) method 310 described above (i.e., if the callback existed and was removed successfully, then set ExecutingCallback=callback, such that the WaitForCallbackToComplete( ) method 328 can observe it, and call the callback), if throwOnFirstException is "true", then control is returned to the original thread, any cleanup steps are performed (e.g., to reclaim memory for the callback tracking data structure 324) and the exception is re-thrown. If throwOnFirstException is "false", the system continues executing callbacks in sequence and collates the exceptions, and when all callbacks have been executed, the system returns control to the original thread, performs any cleanup steps (e.g., to reclaim memory for the callback tracking data structure 324) and throws an AggregateException that contains all of the individual exceptions.

It is noted that the mode where throwOnFirstException is "true" may provide the most detailed tracking information for the exception that is raised, but that the mode where throwOnFirstException is "false" may be more appropriate for situations where the participants that have registered callbacks are disparate and should not miss out on notifications because of exceptions raised by other participants. In general, the mode where throwOnFirstException is "false" is likely to be most generally useful and is used as a default in one embodiment.

Figure 5:
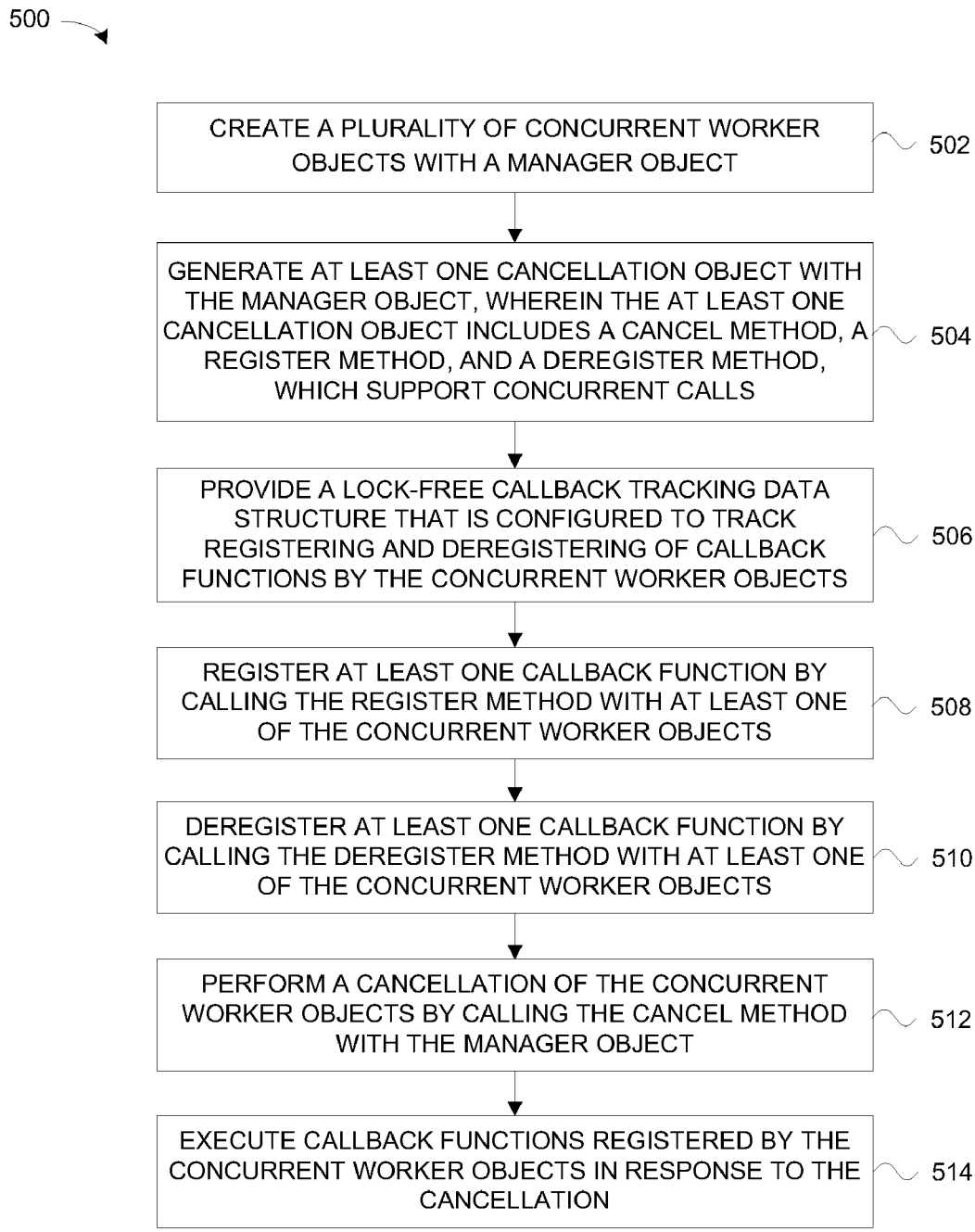
FIG. 5 is a flow diagram illustrating a method of performing a cancellation of concurrent worker objects according to one embodiment.

FIG. 5 is a flow diagram illustrating a method 500 of performing a cancellation of concurrent worker objects according to one embodiment. At 502, a manager object 302 creates a plurality of concurrent worker objects 304. At 504, at least one cancellation object 308 and 316 is generated by the manager object 302, wherein the at least one cancellation object includes a cancel method 310, a register method 320, and a deregister method 322, which support concurrent calls. At 506, a lock-free callback tracking data structure 324 is provided that is configured to track registering and deregistering of callback functions by the concurrent worker objects 304. At 508, at least one callback function is registered by calling the register method 320 with at least one of the concurrent worker objects 304. At 510, at least one callback function is deregistered by calling the deregister method 322 with at least one of the concurrent worker objects 304. At 512, a cancellation of the concurrent worker objects 304 is requested by calling the cancel method 310 with the manager object 302. At 514, callback functions registered by the concurrent worker objects 304 are executed in response to the cancellation. In one embodiment, the steps of method 500 are performed by at least one processor.

In one embodiment, the at least one cancellation object in method 500 includes a cancellation token source object 308 and a cancellation token object 316, and the manager object 302 calls a GetToken method 312 of the cancellation token source object 308 to create the cancellation token object 316. In one embodiment of method 500, the manager object 302 passes the cancellation token object 316 to each of the concurrent worker objects 304. The concurrent worker objects 304 in method 500 according to one embodiment monitor the cancellation token object 316 to determine whether cancellation has been requested. In one embodiment of method 500, the cancellation token source object 308 includes the cancel method 310, and the cancellation token object 316 includes the register method 320 and the deregister method 322, which are configured to be called by the concurrent worker objects 304 to register and deregister callback functions. The register method 320 according to one embodiment provides for both immediate execution and delayed execution. The deregister method 322 according to one embodiment provides for both immediate deregistration and waiting for concurrently executing callback functions to complete.

The lock-free callback tracking data structure 324 in method 500 according to one embodiment comprises a plurality of sparse arrays 402, wherein each sparse array comprises a doubly linked list of array segments 404, and wherein each array segment includes a plurality of slots 406 for storing callback information 408. In one embodiment of method 500, the register method 320 is configured to accept a parameter that indicates that the callback function is to be executed in a current synchronization context. The method 500 according to one embodiment further includes accumulating exceptions thrown by callback functions, and re-throwing the accumulated exceptions after execution of the callback functions. The method 500 according to another embodiment further includes executing callback functions one by one, and stopping execution of the callback functions when one of the callback functions throws an exception. In one embodiment of method 500, the cancel method 310 is configured to accept a parameter that indicates whether exceptions thrown by callback functions are to be accumulated and re-thrown after execution of the callback functions, or whether execution of the callback functions is to be stopped upon the throwing of an exception by one of the callback functions.

Figure 6:
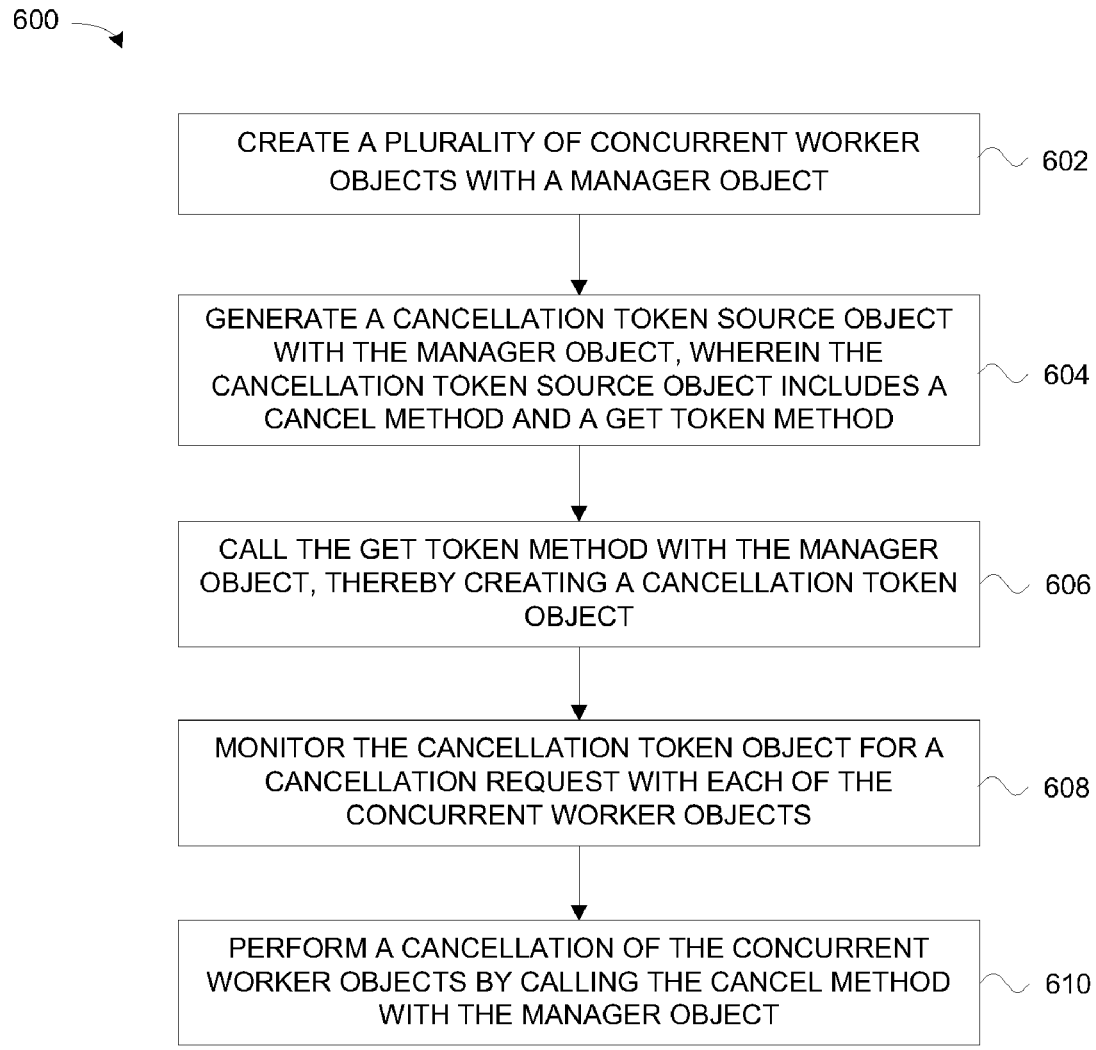
FIG. 6 is a flow diagram illustrating a method of performing a cancellation of concurrent worker objects according to another embodiment.

FIG. 6 is a flow diagram illustrating a method 600 of performing a cancellation of concurrent worker objects according to another embodiment. At 602, a manager object 302 creates a plurality of concurrent worker objects 304. At 604, the manager object 302 generates a cancellation token source object 308, wherein the cancellation token source object 308 includes a cancel method 310 and a get token method 312. At 606, the manager object 302 calls the get token method 312 of the cancellation token source object 308, thereby creating a cancellation token object 316. At 608, each of the concurrent worker objects 304 monitors the cancellation token object 316 for a cancellation request. At 610, a cancellation of the concurrent worker objects 304 is performed by calling the cancel method 310 with the manager object 302. In one embodiment, the steps of method 600 are performed by at least one processor.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of performing a cancellation of concurrent worker objects, the method comprising:
    creating a plurality of concurrent worker objects with a manager object;
    generating at least one cancellation object with the manager object, the at least one cancellation object including a cancel method and a register method that support concurrent calls;
    registering a callback function by calling the register method with one of the concurrent worker objects;
    requesting a cancellation of the concurrent worker objects by calling the cancel method with the manager object; and
    wherein the creating, generating, registering, and performing are performed by at least one processor.

2. The method of claim 1, wherein the at least one cancellation object includes a deregister method, and wherein the method further comprises:
    deregistering the callback function by calling the deregister method with one of the concurrent worker objects.

3. The method of claim 1, wherein the at least one cancellation object includes a cancellation token source object and a cancellation token object, and wherein the method further comprises:
    calling a method of the cancellation token source object with the manager object to create the cancellation token object.

4. The method of claim 3, and further comprising:
    passing the cancellation token object to each of the concurrent worker objects.

5. The method of claim 4, and further comprising:
    monitoring the cancellation token object with each of the concurrent worker objects to determine whether cancellation has been requested.

6. The method of claim 3, wherein the cancellation token source object includes the cancel method, wherein the cancellation token object includes the register method, and wherein the register method provides for both immediate execution and delayed execution.

7. The method of claim 6, wherein the cancellation token object further includes a deregister method configured to be called by the concurrent worker objects to deregister callback functions, and wherein the deregister method provides for both immediate deregistration and waiting for concurrently executing callback functions to complete.

8. The method of claim 1, and further comprising:
    providing a lock-free callback tracking data structure that is configured to track registering and deregistering of callback functions by the concurrent worker objects.

9. The method of claim 8, wherein the lock-free callback tracking data structure comprises a plurality of sparse arrays.

10. The method of claim 9, wherein each sparse array comprises a doubly linked list of array segments, and wherein each array segment includes a plurality of slots for storing callback information.

11. The method of claim 1, wherein the register method is configured to accept a parameter that indicates that the callback function is to be executed in a current synchronization context.

12. The method of claim 1, and further comprising:
    accumulating exceptions thrown by callback functions; and
    re-throwing the accumulated exceptions after execution of the callback functions.

13. The method of claim 1, and further comprising:
    executing callback functions one by one; and
    stopping execution of the callback functions when one of the callback functions throws an exception.

14. The method of claim 1, wherein the cancel method is configured to accept a parameter that indicates whether exceptions thrown by callback functions are to be accumulated and re-thrown after execution of the callback functions, or whether execution of the callback functions is to be stopped upon the throwing of an exception by one of the callback functions.

15. A computer-readable storage medium storing computer-executable instructions that when executed by at least one processor cause the at least one processor to perform a method of performing a cancellation of concurrent worker objects, the method comprising:

creating a plurality of concurrent worker objects with a manager object;

generating at least one cancellation object with the manager object, the at least one cancellation object including a cancel method, a register method, and a deregister method, which support concurrent calls;

registering a callback function by calling the register method with one of the concurrent worker objects; and performing a cancellation of the concurrent worker objects by calling the cancel method with the manager object.

16. The computer-readable storage medium of claim 15, wherein the at least one cancellation object includes a cancellation token source object and a cancellation token object, and wherein the method further comprises:

calling a method of the cancellation token source object with the manager object to create the cancellation token object; and passing the cancellation token object to each of the concurrent worker objects.

17. The computer-readable storage medium of claim 16, and further comprising:

monitoring the cancellation token object with each of the concurrent worker objects to determine whether cancellation has been requested.

18. The computer-readable storage medium of claim 16, wherein the cancellation token source object includes the cancel method, and wherein the cancellation token object includes the register method and the deregister method.

19. The computer-readable storage medium of claim 16, wherein the method further comprises:

providing a lock-free callback tracking data structure that is configured to track registering and deregistering of callback functions by the concurrent worker objects.

20. A method of performing a cancellation of concurrent worker objects, the method comprising:

creating a plurality of concurrent worker objects with a manager object;

generating a cancellation token source object with the manager object, the cancellation token source object including a cancel method and a get token method;

calling the get token method with the manager object, thereby creating a cancellation token object;

monitoring the cancellation token object for a cancellation request with each of the concurrent worker objects;

performing a cancellation of the concurrent worker objects by calling the cancel method with the manager object; and wherein the creating, generating, calling, monitoring, and performing are performed by at least one processor.

* * * * *